United States Patent
Suzuki et al.

(10) Patent No.: US 10,471,856 B2
(45) Date of Patent: Nov. 12, 2019

(54) LIFTER DEVICE

(71) Applicant: TOYOTA BOSHOKU KABUSHIKI KAISHA, Aichi-ken (JP)

(72) Inventors: Yasuaki Suzuki, Aichi-ken (JP); Yusuke Kajino, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/966,757

(22) Filed: Apr. 30, 2018

(65) Prior Publication Data
US 2018/0339610 A1     Nov. 29, 2018

(30) Foreign Application Priority Data

May 25, 2017     (JP) .................................. 2017-103694

(51) Int. Cl.
| | |
|---|---|
| *B60N 2/16* | (2006.01) |
| *B60N 2/04* | (2006.01) |
| *B60N 2/02* | (2006.01) |

(52) U.S. Cl.
CPC ............ *B60N 2/165* (2013.01); *B60N 2/0244* (2013.01); *B60N 2/045* (2013.01); *B60N 2/167* (2013.01); *B60N 2/1685* (2013.01)

(58) Field of Classification Search
CPC ...... B60N 2/165; B60N 2/0244; B60N 2/045; B60N 2/1615; B60N 2/167; B60N 2/1685
USPC ..... 297/344.14, 366, 367 R, 368, 369, 367 P
See application file for complete search history.

(56) References Cited

U.S. PATENT DOCUMENTS

| | | | |
|---|---|---|---|
| 6,283,886 B1* | 9/2001 | Schumann | B60N 2/933 475/162 |
| 6,371,557 B1* | 4/2002 | Holloway | B60N 2/224 192/223.1 |
| 2009/0140565 A1* | 6/2009 | Wahls | B60N 2/236 297/369 |
| 2012/0279332 A1* | 11/2012 | Suzuki | B60N 2/161 74/143 |
| 2014/0238188 A1* | 8/2014 | Ito | B60N 2/0228 74/664 |

(Continued)

FOREIGN PATENT DOCUMENTS

JP     2016-12423     7/2016

OTHER PUBLICATIONS

German Office Action issued on Aug. 8, 2019 in German Application No. 10 2018 208 010.0 and English Translation thereof.

*Primary Examiner* — Syed A Islam
(74) *Attorney, Agent, or Firm* — Greenblum & Bernstein, P.L.C.

(57) ABSTRACT

A lifter device, wherein a pawl operating member is configured to be rotatable with respect to a rotation shaft so as to rotate in accordance with an operation of an operation handle and includes a first projection protrudingly formed on its outer peripheral side for rotational alignment, wherein a support member includes a second projection which is protrudingly formed so as to face the first projection and which serves as a reference position of a pawl operating member in a rotational direction, and wherein, in a state where the operation handle is not operated, a second spring is configured to bias the first projection so as to overlap with the second projection in the rotational direction of the pawl operating member.

3 Claims, 16 Drawing Sheets

(56) References Cited

U.S. PATENT DOCUMENTS

2015/0130245 A1\* 5/2015 Linnenbrink ............ B60N 2/68
  297/366
2017/0088018 A1  5/2017 Suzuki
2018/0141469 A1\* 5/2018 Suzuki .................. B60N 2/167

\* cited by examiner

LIFTER DEVICE

CROSS-REFERENCE TO RELATED APPLICATIONS

This application claims priority from Japanese Patent Application No. 2017-103694 filed on May 25, 2017, the entire contents of which are incorporated herein by reference.

TECHNICAL FIELD

The disclosure relates to a lifter device used for a seat of a vehicle or the like.

BACKGROUND

A lifter device used for a seat of a vehicle or the like is adapted to adjust the height of a seat cushion to a floor by operating an operation handle, and various types of lifter devices have been developed. In the invention disclosed in JP-A-2016-132423, when an operation handle is operated to a seat lifting side or a seat lowering side, the height adjustment is performed by a fixed amount for each operation, and the operation of the operation handle is repeated until a seated person reaches a desired height.

Specifically, a rotation control device is configured to rotate a pinion gear coupled to a link mechanism so as to lift or lower a seat by operating the operation handle to the seat lifting side or the seat lowering side. In the rotation control device, a rotation driving mechanism for rotationally driving the pinion gear and the lock mechanism for locking the rotation of the pinion gear are provided to a rotation shaft of the pinion gear.

The lock mechanism includes a ratchet wheel which rotates in synchronization with the rotation shaft and has an engaging claw formed on its outer periphery, a pawl which is held on a support member so as to be prevented from moving in a rotational direction of the rotation shaft and to be movable inward in a radial direction of the rotation shaft and which is provided to be engageable with the engaging claw of the ratchet wheel from an outer peripheral side, a spring which biases the pawl in a direction of engaging with the ratchet wheel, and a pawl operating member which brings the pawl into an engagement state with ratchet wheel in a non-operated state of the operation handle, which brings the pawl into a free state when the operation handle is operated to the seat lifting side, and which separates the pawl from the ratchet wheel when the operation handle is operated to the seat lowering side. Further, the engaging claw of the ratchet wheel has a shape that does not engage with the pawl when the ratchet wheel is rotated in the lifting direction together with the rotation shaft and that engages with the pawl when the ratchet wheel is rotated in the lowering direction together with the rotation shaft.

When the operation handle is operated to the seat lifting side, the pinion gear is rotationally driven to lift the seat by the rotation driving mechanism. At this time, the lock mechanism locks the rotation of the pinion gear by engaging the pawl with the ratchet wheel at the position where the pinion gear is rotated by the operation of the operation handle.

When the operation handle is operated to the seat lowering side, the rotation driving mechanism does not function, and the lock mechanism separates the pawl from the ratchet wheel to release the locking of the pinion gear. In this way, the pinion gear is rotated in the direction of lowering the seat. At this time, in order to suppress the lowering speed of the seat, the speed is suppressed by a damper coupled to the rotation shaft of the pinion gear.

In a state where the operation handle is not operated, the pawl is engaged with the ratchet wheel and the rotation of the pinion gear is locked by the lock mechanism, so that the height of the seat is maintained.

In order for the lock mechanism to be actuated in accordance with the operation of the operation handle, it is necessary to control the relationship between the pawl and the ratchet wheel in a designed state according to the operation of the operation handle. Therefore, the pawl operating member is brought into a reference position in the non-operated state of the operation handle, and the pawl operating member is moved around the reference position in accordance with the operation of the operation handle.

The alignment of the pawl operating member to the reference position is performed by making the rotational position of the pawl operating member coincide with the support member supporting the rotation shaft. However, in the invention disclosed in JP-A-2016-132423, there is a problem that the number of parts to be interposed between the support member and the pawl operating member is increased when the rotational position of the pawl operating member is aligned to the reference position with respect to the support member. Therefore, in order to align the pawl operating member with the support member with high accuracy, it is necessary to enhance the dimensional accuracy of the parts to be interposed, which causes an increase in cost.

SUMMARY

The disclosure aims to provide a lifter device which is configured to adjust the height of a seat by a rotation driving mechanism and a lock mechanism based on an operation of an operation handle and in which the alignment of a pawl operating member of the lock mechanism to a reference position with respect to a support member can be directly performed without other parts being interposed therebetween. In this manner, the disclosure aims to perform the alignment of the pawl operating member to the support member with high accuracy without improving the dimensional accuracy of the parts to be interposed.

According to an aspect of the disclosure, there is provided a lifter device including: a pinion gear meshing with an input gear of a link mechanism for lifting and lowering a seat; and a rotation control device configured to control rotation of the pinion gear, the rotation control device including: a rotation shaft configured to rotate in synchronization with the pinion gear; a support member configured to rotatably support the rotation shaft; a rotation driving mechanism provided to the rotation shaft, the rotation driving mechanism being configured to rotationally drive the rotation shaft in a lifting direction when an operation handle for lifting and lowering the seat is operated to lift the seat and being configured to bring the rotation shaft into a free rotation state without rotationally driving the rotation shaft when the operation handle is operated to lower the seat; and a lock mechanism provided to the rotation shaft, the lock mechanism being configured to lock the rotation of the rotation shaft at an operation end position of the operation handle when the operation handle is operated to lift the seat and being configured to bring the rotation shaft into a free rotation state without locking the rotation of the rotation shaft when the operation handle is operated to lower the seat, wherein the lock mechanism includes: a ratchet wheel configured to rotate in synchronization with the rotation shaft and having an engaging claw formed on its outer periphery; a pawl configured to be held on the support member so as to be prevented from moving in a rotational direction of the rotation shaft and to be movable in a radial direction of the rotation shaft, the pawl being provided to be engageable with the engaging claw of the ratchet wheel; a first spring configured to bias the pawl in a direction of engaging with the ratchet wheel; and a pawl operating member configured to bring the pawl into an engagement state with ratchet wheel in a non-operated state of the operation handle, configured to bring the pawl into a free state when the operation handle is operated to a seat lifting side, and configured to separate the pawl from the ratchet wheel when the operation handle is operated to a seat lowering side, wherein the engaging claw of the ratchet wheel has a shape that does not engage with the pawl when the ratchet wheel is rotated in the lifting direction together with the rotation shaft and that engages with the pawl when the ratchet wheel is rotated in the lowering direction together with the rotation shaft, wherein the pawl operating member is configured to be rotatable with respect to the rotation shaft so as to rotate in accordance with the operation of the operation handle and includes a first projection protrudingly formed on its outer peripheral side for rotational alignment, wherein the support member includes a second projection which is protrudingly formed so as to face the first projection and which serves as a reference position of the pawl operating member in the rotational direction, and wherein, in a state where the operation handle is not operated, a second spring is configured to bias the first projection so as to overlap with the second projection in the rotational direction of the pawl operating member.

Accordingly, by causing the first projection of the pawl operating member to overlap with the second projection of the support member in the rotational direction of the pawl operating member in the non-operated state of the operation handle, the pawl operating member is aligned to the reference position. At this time, the first projection of the pawl operating member is directly aligned with the second projection of the support member. Therefore, no other parts are interposed between the first projection and the second projection at the time of alignment, and the alignment can be performed without being affected by the dimensional accuracy of other parts. As a result, there is no need to increase the dimensional accuracy of other parts in order to improve the accuracy of the alignment. In this manner, it is also possible to solve the problem that the cost of other parts increases.

DETAILED DESCRIPTION

Overall Configuration of One Embodiment

Figure 1:
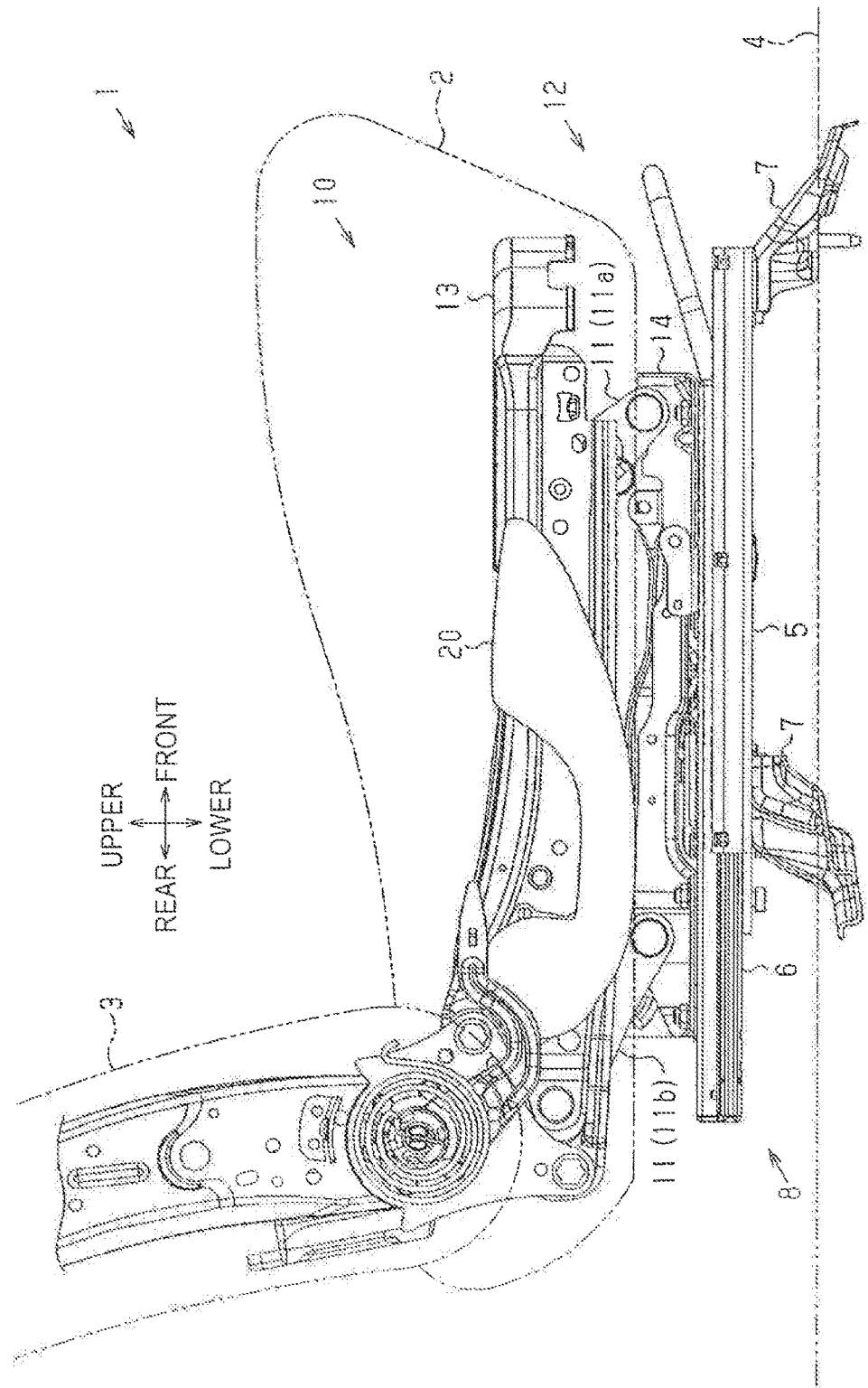
FIG. 1 is a side view of a seat to which a lifter device according to an embodiment of the disclosure is applied.
Figure 2:
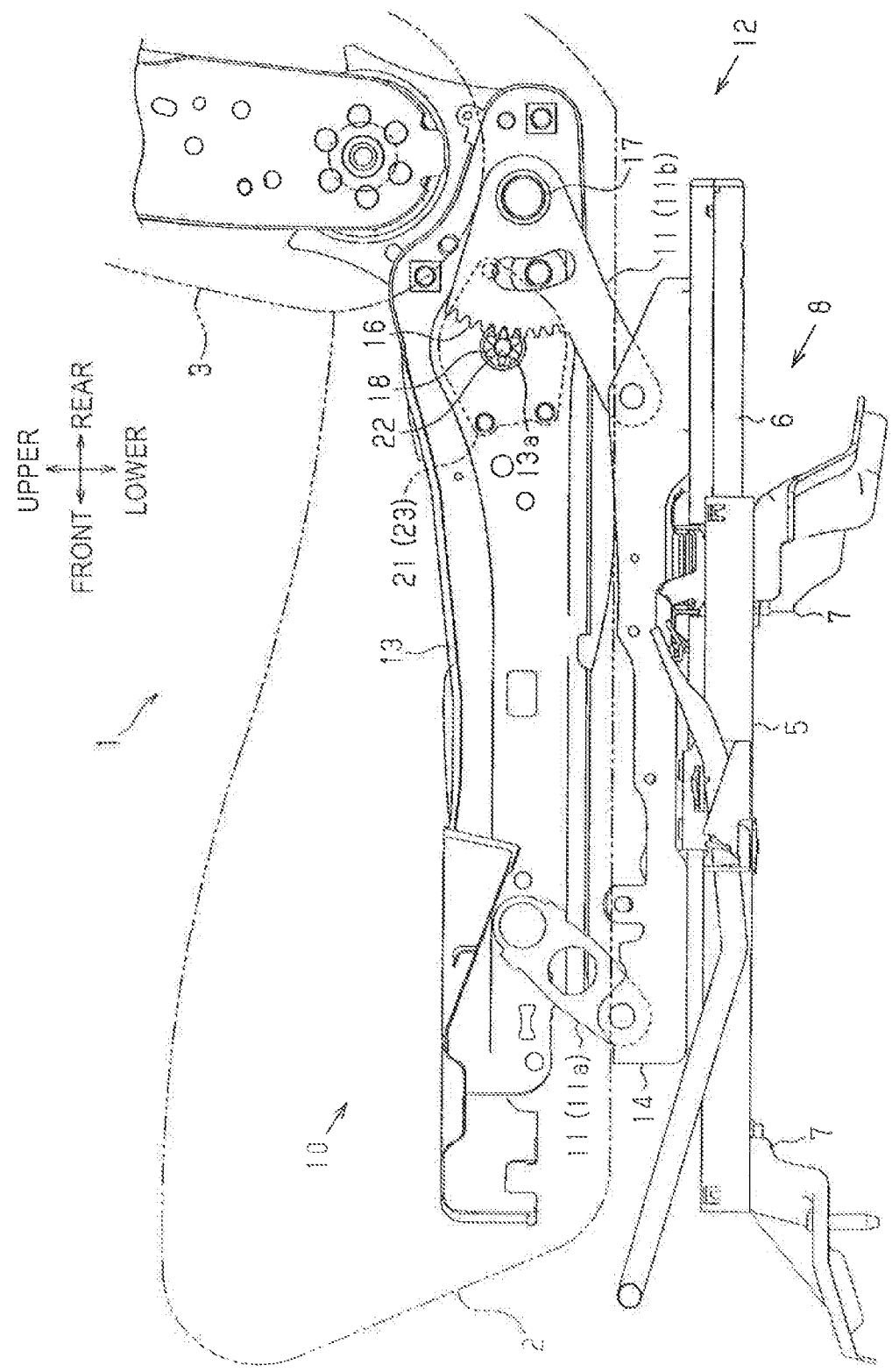
FIG. 2 is a side view as seen from the inside of the seat in the above embodiment.
Figure 3:
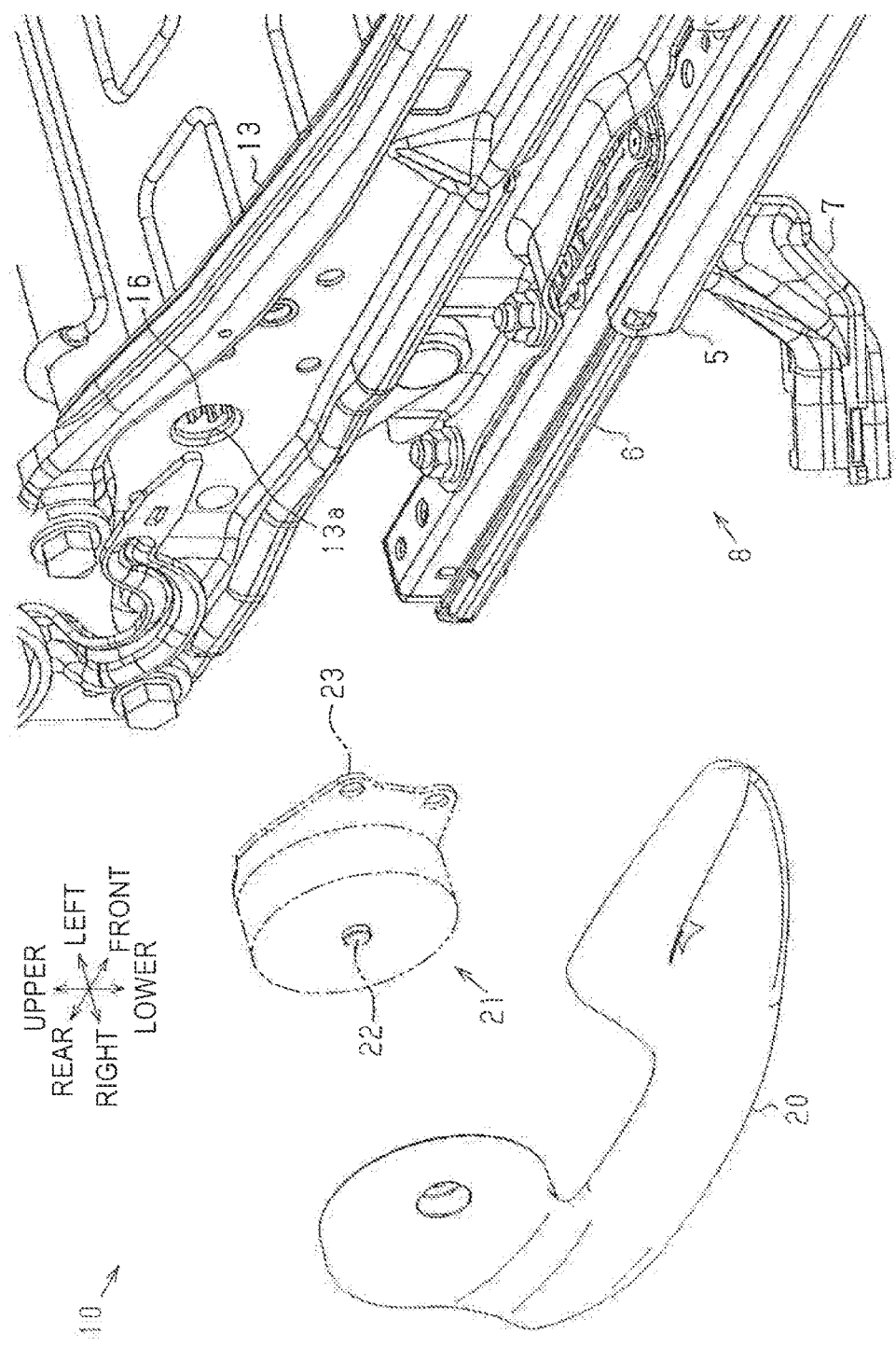
FIG. 3 is an exploded perspective view of a main part in the above embodiment.

FIGS. 1 to 3 show a vehicle seat (hereinafter, simply referred to as a "seat") 1 to which a lifter device according to an embodiment of the disclosure is applied. In each drawing, directions of each part in the state where the seat is mounted to a vehicle are indicated by arrows. In the following, the descriptions relating to the directions will be made on the basis of these directions.

As shown in FIG. 1, the seat 1 is configured such that a seat back 3 forming a backrest is provided on the rear side of a seat cushion 2 forming a seating part. The seat back 3 is rotatable in a front and rear direction with respect to the seat cushion 2. The seat cushion 2 includes a lifter device 10 and a seat slide device 8 at its lower portion and is fixed to a vehicle floor 4 via a bracket 7.

As shown in FIG. 2, the seat slide device 8 is a known one and is configured such that a pair of left and right upper rails 6 is coupled to a pair of left and right lower rails 5 extending in the front and rear direction so as to be slidable back and forth. The left and right lower rails 5 are fixedly supported by a pair of front and rear brackets 7 fixed to the floor 4, respectively. The lifter device 10 is provided on the left and right upper rails 6.

As shown in FIGS. 2 and 3, the lifter device 10 includes a base member 14 fixed on each upper rail 6 and a plurality of link members 11 rotatably coupled to front and rear end portions of each upper rail 6. A side frame 13 as a framework member of the seat cushion 2, the base member 14 and the link members 11 constitute a link mechanism 12 that is a four-bar linkage. A rear link 11b on the right rear side among the plurality of link members 11 includes a sector gear (corresponding to the input gear in the disclosure) 16 and is configured to be rotated in the front and rear direction by a pinion gear 18 of a rotation control device 21. A rotation shaft of the rear link 11b on the right rear side with respect to the side frame 13 is configured by a torque rod 17. A rear link (not shown) on the left rear side is also configured so as to be rotated in synchronization with the rear link 11b via the torque rod 17.

A through-hole 13a for inserting the pinion gear 18 is formed in the side frame 13. The rotation control device 21 is fixed to a right wall of the side frame 13 such that the pinion gear 18 is inserted into the through-hole 13a. The rotation control device 21 is rotatable in forward and reverse directions by an operation handle 20 which is provided on the right side of the seat cushion 2 so as to extend in the front and rear direction. When the operation handle 20 is rotated upward, the rotation control device 21 is rotated so that the rear link 11b is erected from the base member 14. When the operation handle 20 is rotated downward, the rotation control device 21 is rotated so that the rear link 11b is folded on the base member 14. With the configuration of the above-described four-bar linkage, a front link 11a is also rotated in accordance with the rotation of the rear link 11b and the height of the seat cushion 2 from the floor 4 is adjusted according to the operation of the operation handle 20.

<Configuration of Rotation Control Device 21 (Rotation Shaft 22 and Support Member 23)>

Figure 4:
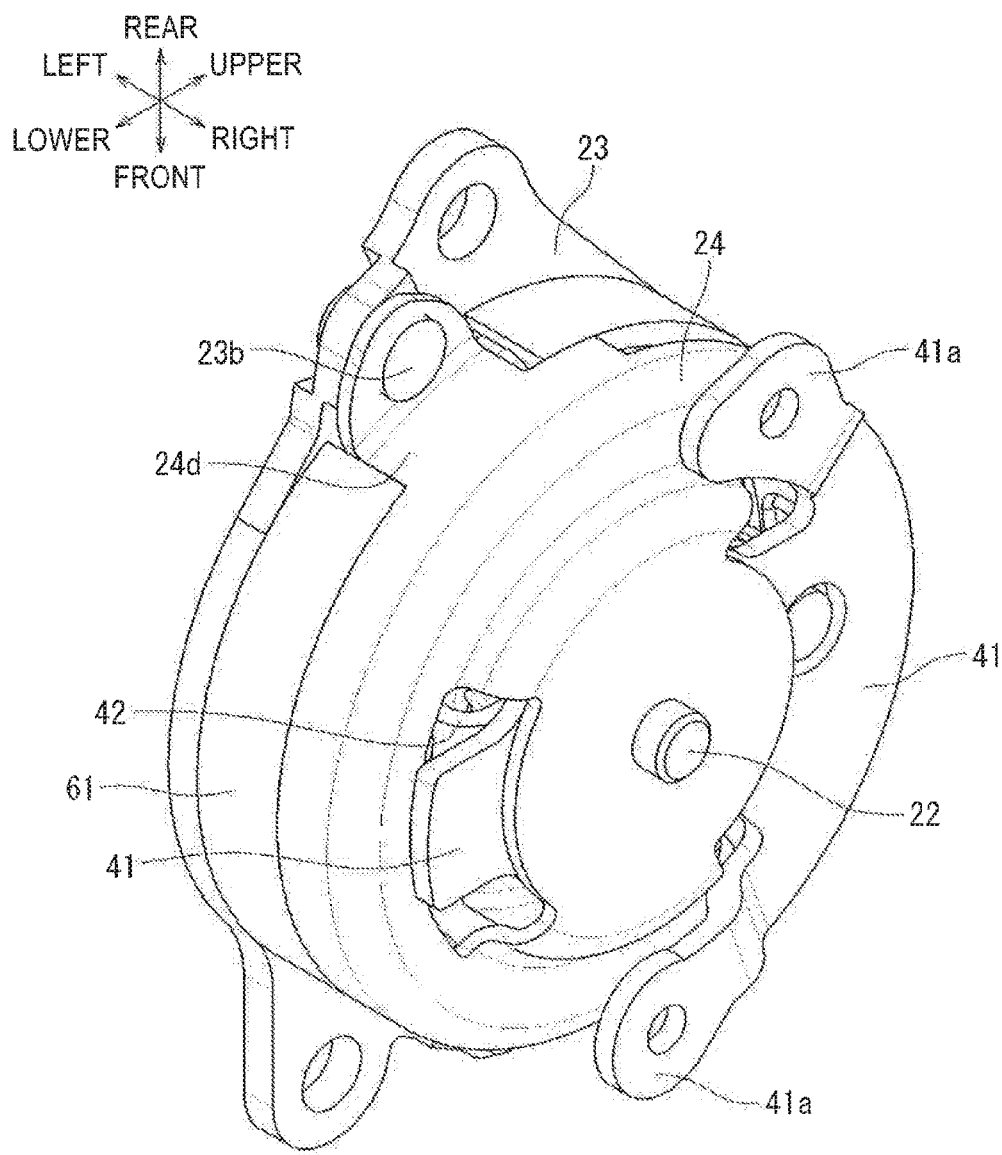
FIG. 4 is a front perspective view of a rotation control device in the above embodiment.
Figure 5:
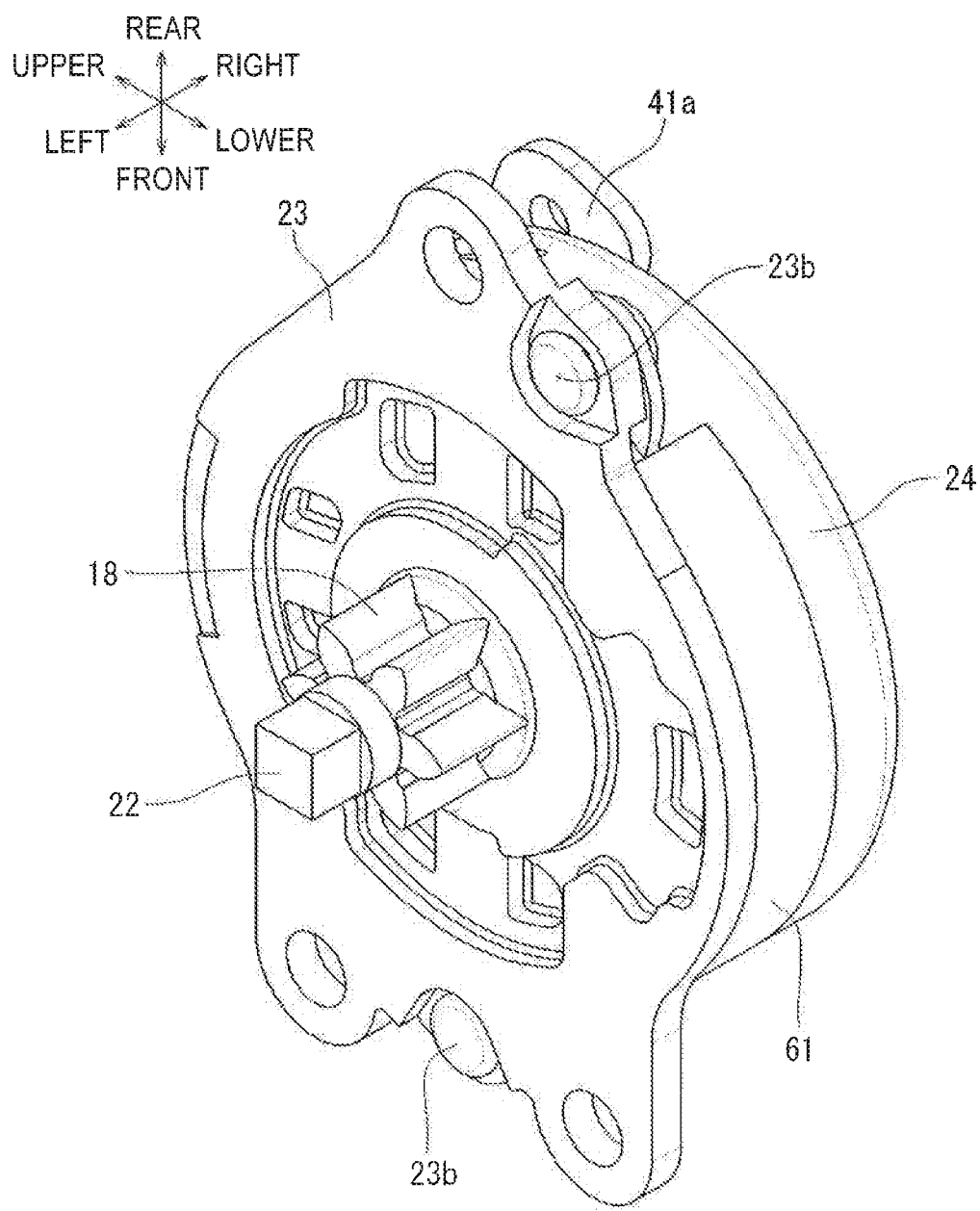
FIG. 5 is a rear perspective view of the rotation control device in the above embodiment.
Figure 6:
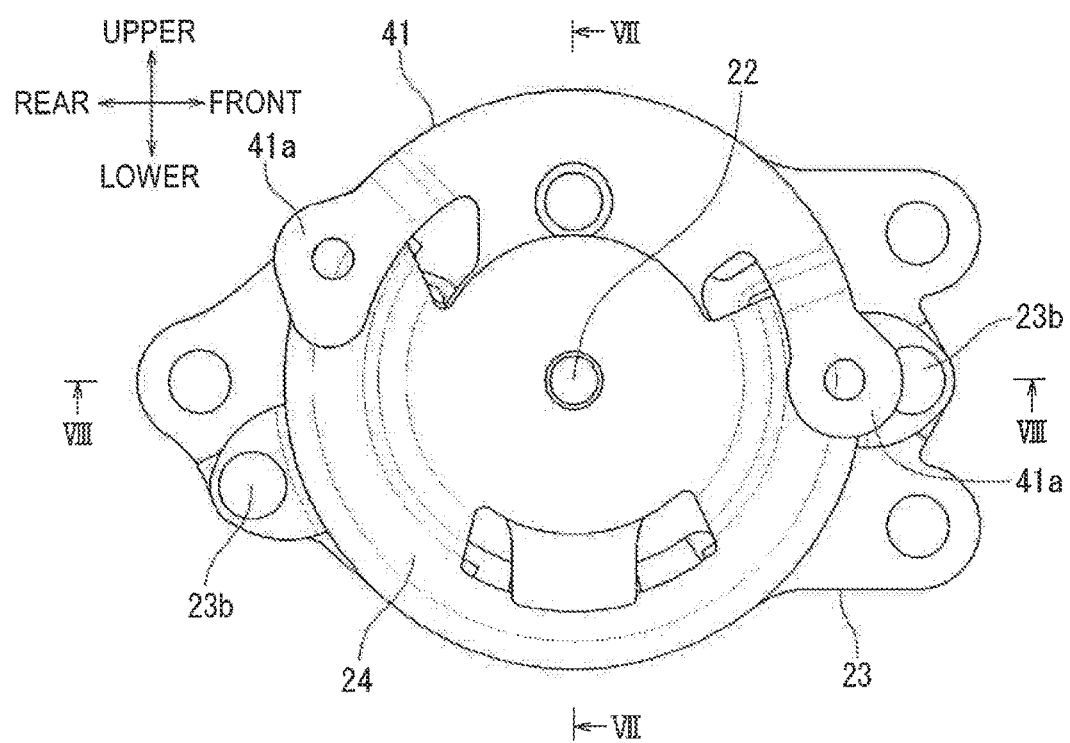
FIG. 6 is a front view of the rotation control device in the above embodiment.

FIGS. 4 to 6 show a state in which the rotation control device 21 is detached from the seat cushion 2. Hereinafter, the configuration of the rotation control device 21 will be described with reference to FIGS. 4 to 10.

The rotation control device 21 is integrated in such a manner that a cap-shaped cover 24 is covered on a support member 23 as a base member with a generally disc-shaped intermediate member 61 interposed therebetween. Two leg portions 26 of the cover 24 are crimped to through-holes 23a on the support member 23 by rivets 23b, so that the cover 24 is fixed to the support member 23 together with the intermediate member 61. A rotation shaft 22 is provided so as to pass through the centers of the support member 23, the intermediate member 61 and the cover 24.

Figure 8:
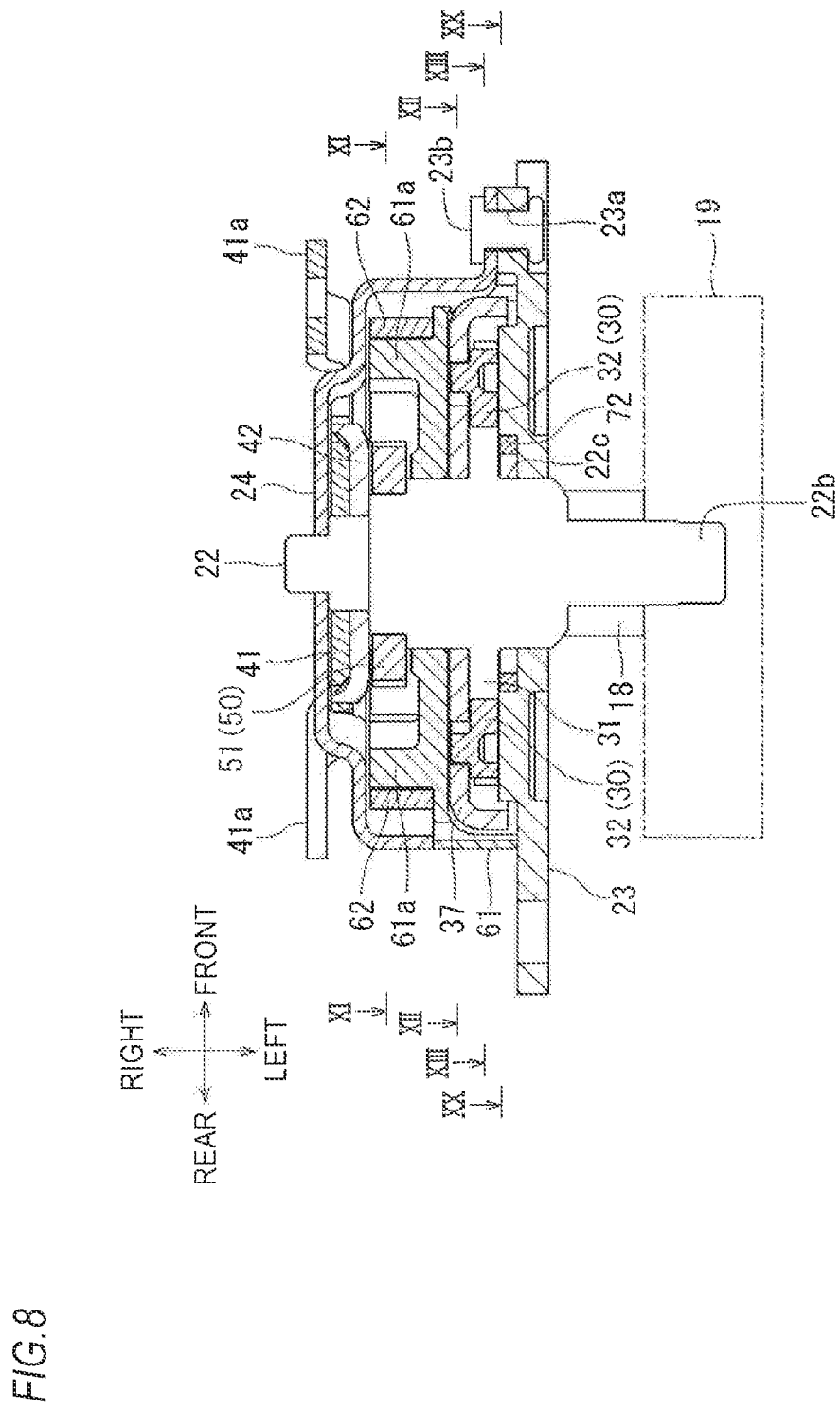
FIG. 8 is a sectional view taken the line VIII-VIII in FIG. 6.
Figure 9:
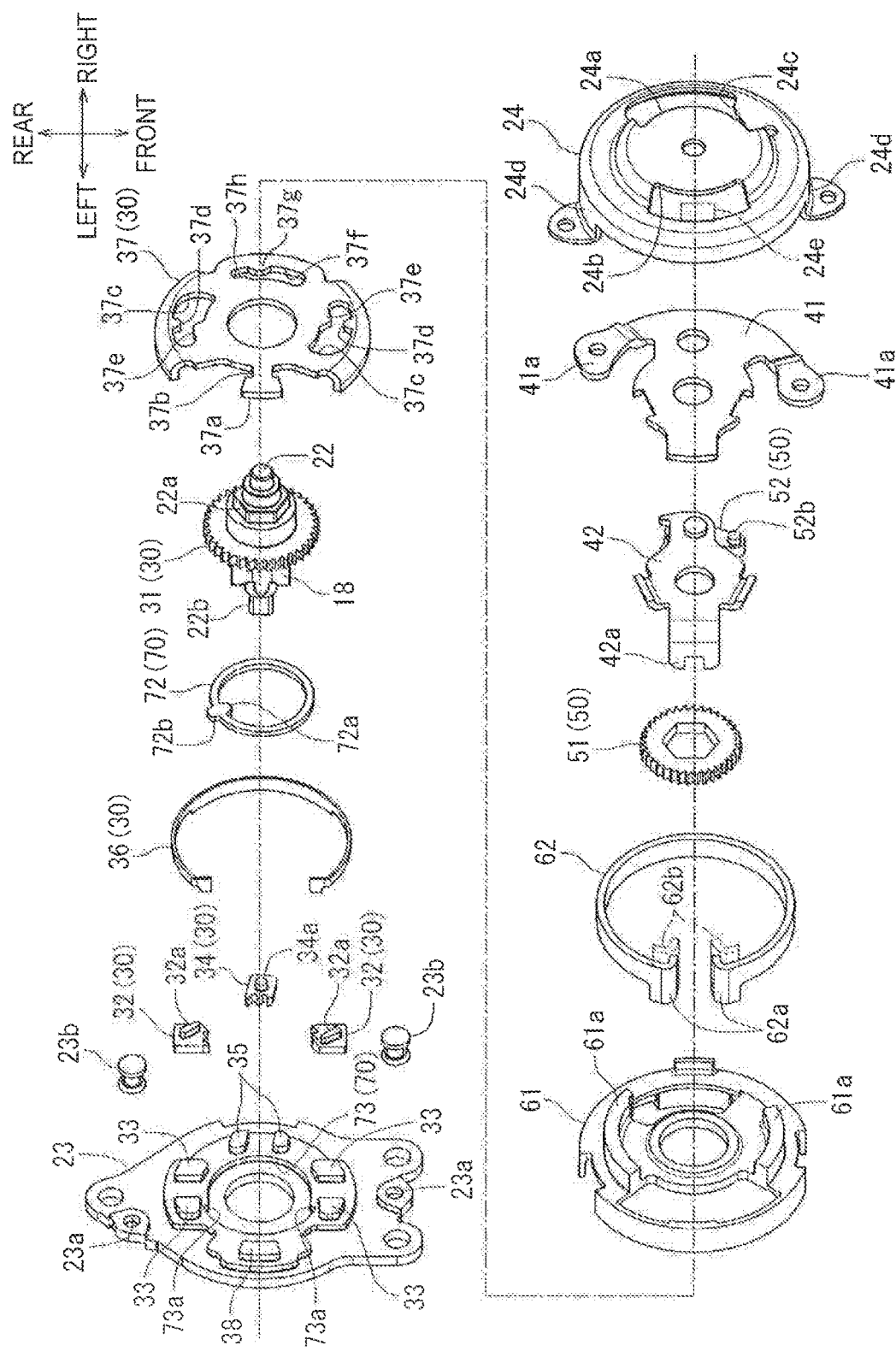
FIG. 9 is an exploded perspective view of the rotation control device in the above embodiment.
Figure 10:
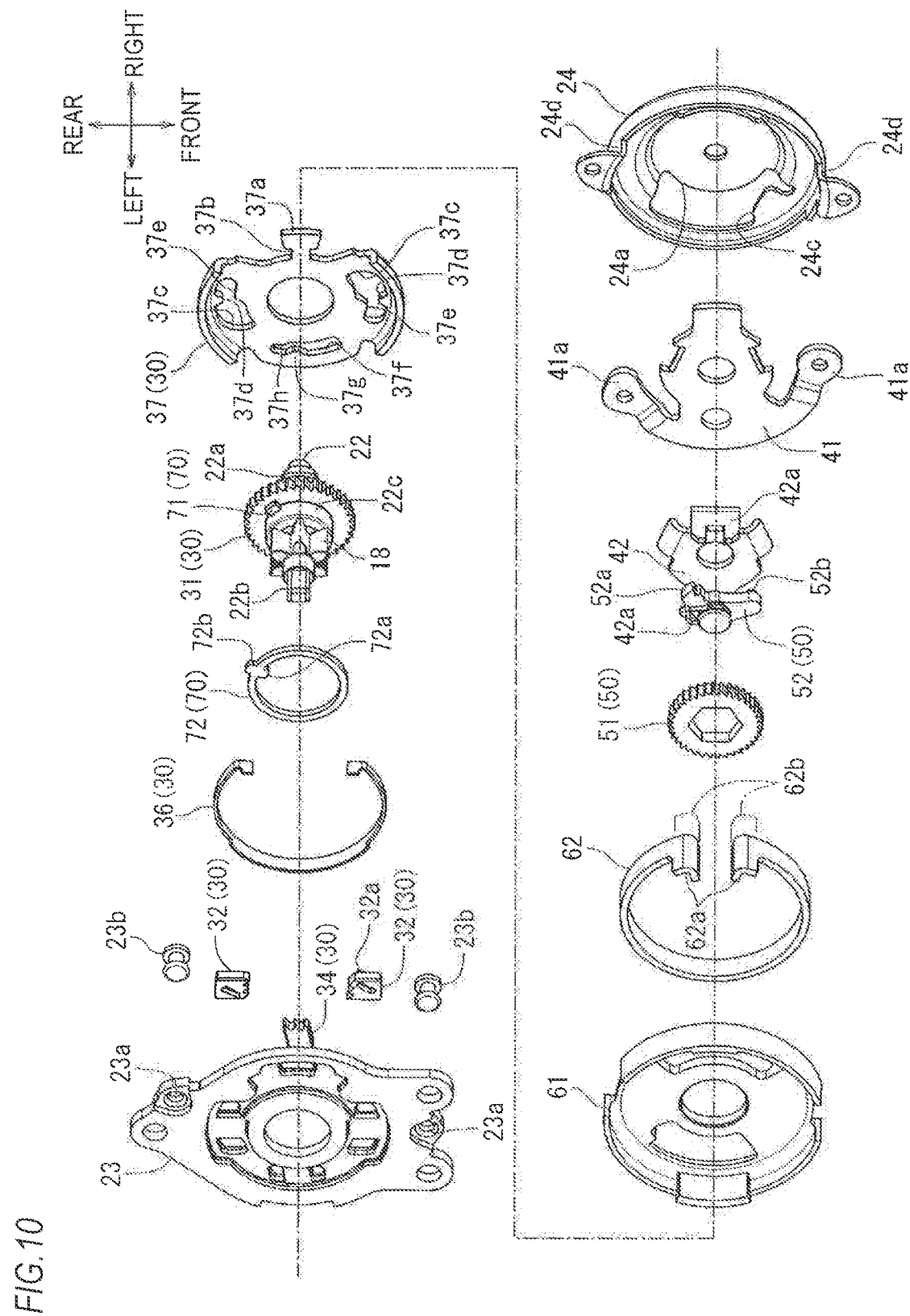
FIG. 10 is an exploded perspective view of the rotation control device in the above embodiment, as seen from an angle different from FIG. 9.

The pinion gear 18 is integrally formed at the left end portion of the rotation shaft 22, and a ratchet wheel 31 is integrally formed between both ends thereof. Further, a hexagonal portion 22a is formed at the portion of the rotation shaft 22 on the right side of the ratchet wheel 31. Furthermore, a rectangular portion 22b having a quadrangular column shape is formed at the left leading end of the pinion gear 18. Both ends of the rotation shaft 22 are formed so as to protrude from the support member 23 and the cover 24, and the pinion gear 18 is provided at a position protruding from the support member 23. As shown in FIG. 8, a damper 19 is coupled to the rectangular portion 22b. As is well known, the damper 19 is adapted to suppress a sudden change in the rotational speed of the rotation shaft 22.

<Configuration of Rotation Control Device 21 (Rotation Driving Mechanism 50)>

Arcuate openings 24a, 24b are formed in upper and lower portions of the right central portion of the cover 24. A substantially T-shaped flat input member 41 is inserted into the openings 24a, 24b. The input member 41 is rotatably supported by the rotation shaft 22. Each end of the input member 41 protrudes from the openings 24a, 24b, Coupling portions 41a at both upper ends of the input member 41 are coupled to the operation handle 20. Therefore, when the operation handle 20 is operated in the upward direction or the downward direction, the input member 41 is rotated in the operation direction thereof. By inserting the input member 41 into the openings 24a, 24b in this manner, the rotational operation angle of the operation handle 20 is limited.

A coupling member 42 is integrally coupled to the left surface of the input member 41 so as to be rotatable with respect to the rotation shaft 22. A driving lever 52 of a rotation driving mechanism 50 is swingably supported on the upper end portion of the coupling member 42. Further, a ratchet wheel 51 is provided on the left surface of the coupling member 42. The ratchet wheel 51 is fitted to the hexagonal portion 22a of the rotation shaft 22 and rotated integrally with the rotation shaft 22. An engaging end portion 52a engaging with a claw of the ratchet wheel 51 is formed at a rear end portion of the driving lever 52. An engaging portion 52b engaging with an engaging piece 24c formed in the opening 24a of the cover 24 is formed at a front end portion of the driving lever 52 so as to protrude to the right side. Further, a spring 42b is hooked between the driving lever 52 and the coupling member 42, so that the engaging end portion 52a is biased toward the side where it engages with the claw of the ratchet wheel 51. The ratchet wheel 51 and the driving lever 52 constitute the rotation driving mechanism 50 of the disclosure.

<Configuration of Rotation Control Device 21 (Lock Mechanism 30)>

On the right surface of the support member 23 and around the ratchet wheel 31, a pair of main pawls 32 and a sub-pawl 34 are arranged in parallel so as to be able to engage with the claw of the outer periphery or the ratchet wheel 31. The pair of main pawls 32 is disposed at front and rear positions on opposite sides of the rotation shaft 22, and the sub-pawl 34 is disposed at an intermediate portion of the pair of main pawls 32. The pair of main pawls 32 and the sub-pawl 34 are sandwiched between a pair of guide portions 33, 35 each provided on the support member 23. The pair of main pawls 32 and the sub-pawl 34 are held by the pair of guide portions 33, 35 such that they are prevented from moving in the rotational direction of the rotation shaft 22 but are movable in the radial direction of the rotation shaft 22. Therefore, the pair of main pawls 32 and the sub-pawl 34 are movable between a position where they engage with the claw of the ratchet wheel 31 and a position where they are released from the engagement with the claw of the ratchet wheel 31. An annular ring spring 36 is disposed on the outer peripheral side of the pair of main pawls 32 and the sub-pawl 34 and normally urges each of the pawls 32, 34 in a direction to engage with the claw of the ratchet wheel 31. Further, engaging protrusions 32a, 34a are formed to protrude on the rear surfaces of the pair of main pawls 32 and the sub-pawl 34.

A pawl operating member 37 is provided at a position located between the support member 23 and the intermediate member 61 and covering the pair of main pawls 32 and the sub-pawl 34 from the right side. The pawl operating member 37 has guide grooves 37c, 37f corresponding to each of the pawls 32, 34 and receiving the engaging protrusions 32a, 34a. Further, a projection 37a extending in the radial direction is formed on the side of the pawl operating member 37 opposite to the guide groove 37f across the rotation shaft 22.

A constricted neck portion 37b is formed at the root portion of the projection 37a to the pawl operating member 37.

A lower end portion of the coupling member 42 is bent in the left direction at a substantially right angle, and a leading end thereof forms an engaging portion 42a which engages the neck portion 37b of the pawl operating member 37 through the intermediate member 61 in the rotational direction of the rotation shaft 22. Therefore, when the input member 41 is rotated, the pawl operating member 37 is rotated via the coupling member 42 to move each of the pawls 32, 34 between a position where they engage with the claw of the ratchet wheel 31 and a position where they are released from the engagement with the claw of the ratchet wheel 31. In order to move each of the pawls 32, 34 by the rotation of the pawl operating member 37, engaging projections 37d. 37e, 37g. 37h are formed in the guide grooves 37c, 37f so as to protrude toward the inside of the guide grooves 37c, 37f, respectively.

The ratchet wheel 31, the pawls 32, 34, the ring spring 36, and the pawl operating member 37 constitute a lock mechanism 30 of the disclosure.

<Configuration of Rotation Control Device 21 (Stopper 70)>

An outer peripheral surface portion 22c is formed on the left side of the ratchet wheel 31 and on the right side of the pinion gear 18. The outer peripheral surface portion 22c is coaxial with the rotation shaft 22 and has a diameter smaller than a diameter of the ratchet wheel 31 and larger than a diameter of the pinion gear 18. Further a projection 71 is integrally formed so as to straddle the outer peripheral surface portion 22c and the left wall surface of the ratchet wheel 31.

On the other hand, on the right surface of the support member 23 and on the inner diameter side of the guide portions 33, 35, a circular guide recess 73 is formed on the outer peripheral side of the rotation shaft 22 by stamping the support member 23 to the left side. The guide recess 73 is formed by two circles having different diameters. A lower circle has a diameter larger than a diameter of an upper circle. As a result, a stepped portion is formed at a boundary portion between the two circles having different diameters, and abutting surface portions 73a are formed in the stepped portion.

Figure 20:
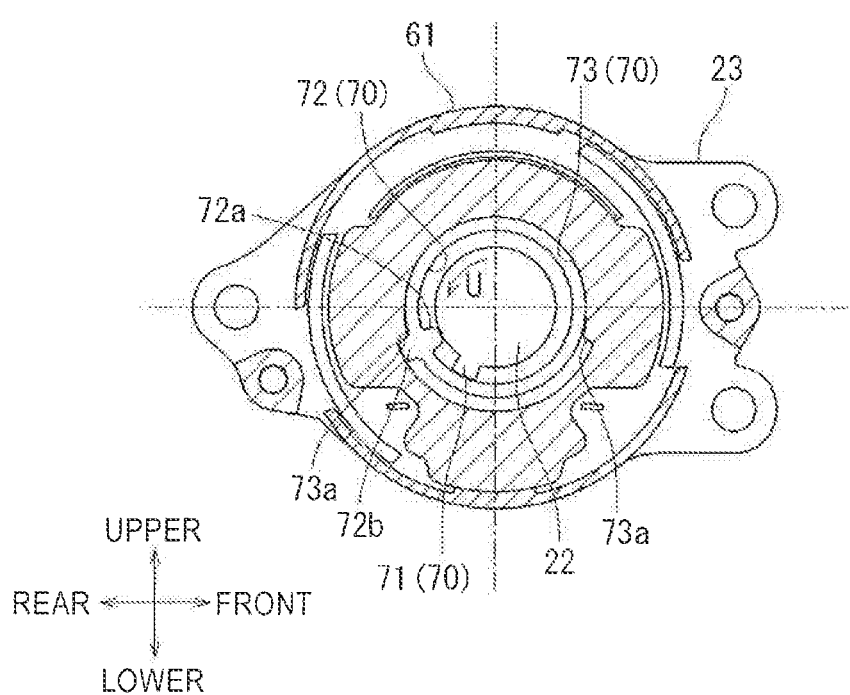
FIG. 20 is a sectional view taken along the line XX-XX in FIG. 8, showing the state in which the operation handle is operated to the lifting side by the first angle.

An annular ring 72 is fitted into the guide recess 73 so as to be rotatable within the guide recess 73. The ring 72 is positioned on the outer peripheral side of the outer peripheral surface portion 22c. On a part of the circumference of the ring 72, a first engaging portion 72a is integrally formed so as to protrude inward in the radial direction and a second engaging portion 72b is integrally formed so as to protrude outward in the radial direction. As shown in FIG. 20, when the ring 72 is rotated, the first engaging portion 72a slides on the outer peripheral surface portion 22c and engages with the projection 71 in the rotational direction. Further, when the ring 72 is rotated, the second engaging portion 72b slides along the large-diameter circle of the guide recess 73 and engages with the abutting surface portions 73a in the rotational direction.

<Configuration of Rotation Control Device 21 (Alignment of Pawl Operating Member 37)>

At a position located on the lower side portion of the support member 23 and facing the projection 37a of the pawl operating member 37, a projection 38 having a size corresponding to the projection 37a as a whole is formed by stamping a plate material of the support member 23 from the left side. Further, a ring spring 62 is provided on the right surface of the intermediate member 61. The ring spring 62 has an open ring shape which is partially cut off. The ring spring 62 receives a spring force in a direction to contract its inner diameter. A pair of arcuate walls 61a is formed on the right surface of the intermediate member 61 and on the circle concentric with the rotation shaft 22. The ring spring 62 is held on the outer peripheral side of the arcuate walls 61a. An opening end portion of the ring spring 62 located at the cut-off portion extends to the left side (to the side of the support member 23) to form extending end portions 62a. Leading ends (left ends) of the extending end portions 62a are abutted on the surface of the support member 23, and the projection 38 and the projection 37a are fitted between the extending end portions 62a. Therefore, the projection 37a is biased so as to be aligned to a position facing (overlapping with) the projection 38 by a spring force of the ring spring 62. That is, in a state where the pawl operating member 37 is not rotated by the operation handle 20, its rotational angle coincides with the projection 38 as a reference position. In this manner, the projection 37a corresponds to the first projection in the disclosure, and the projection 38 corresponds to the second projection in the disclosure.

<Operation of Rotation Control Device 21>

Hereinafter, a height adjustment operation of the seat cushion 2 by the rotation control device 21 will be described with reference to FIGS. 11 to 22.

Figure 11:
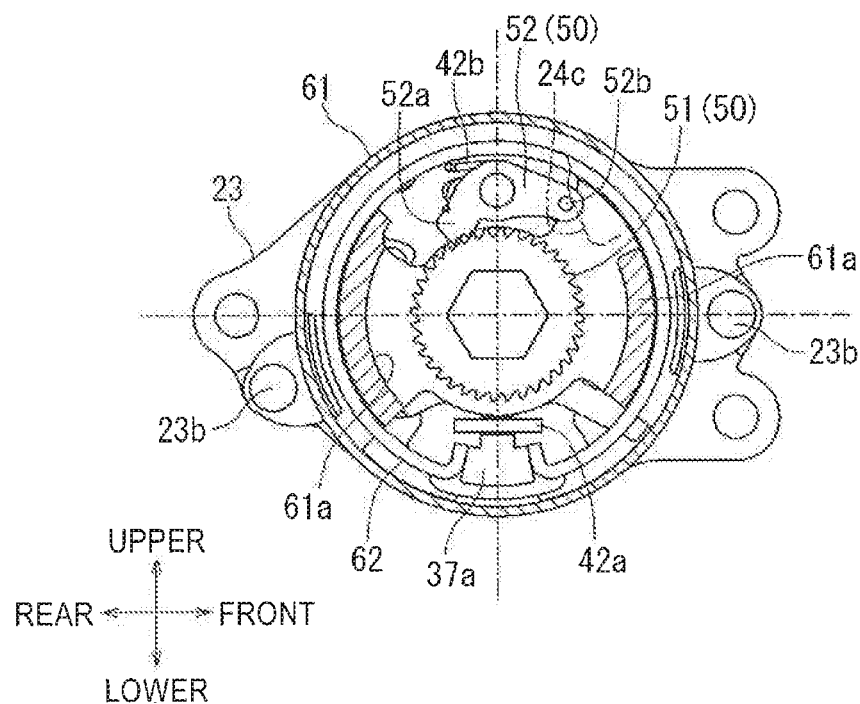
FIG. 11 is a sectional view taken the line XI-XI in FIG. 8.
Figure 12:
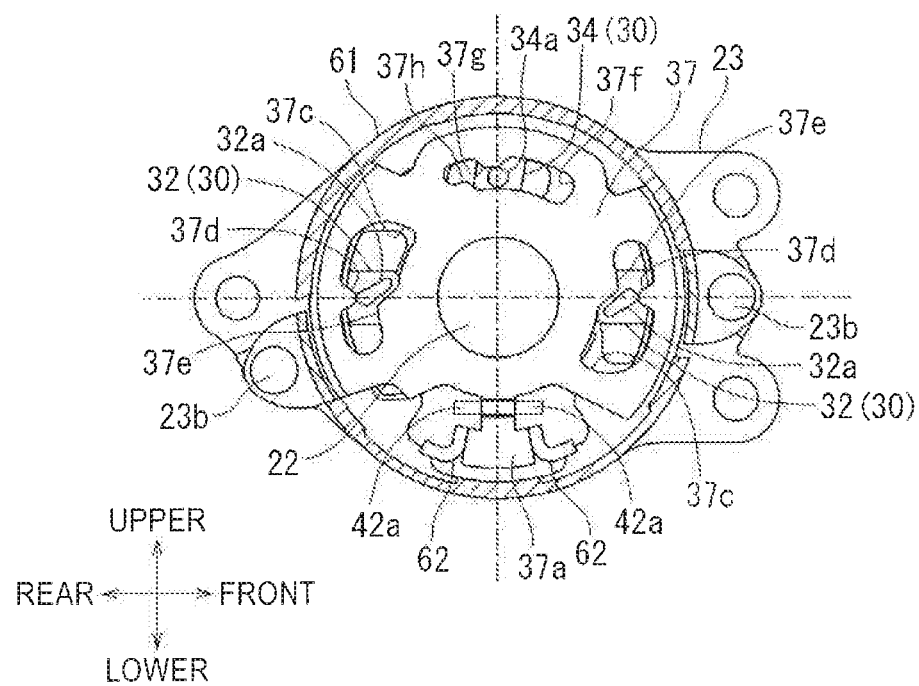
FIG. 12 is a sectional view taken the line XII-XII in FIG. 8.
Figure 13:
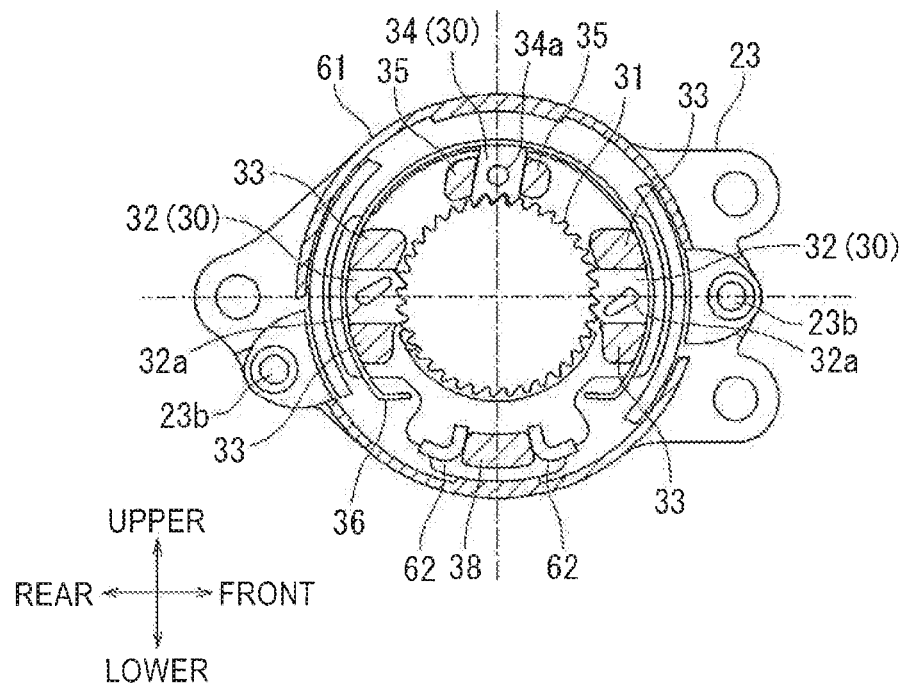
FIG. 13 is a sectional view taken the line XIII-XIII in FIG. 8.

FIGS. 11 to 13 show a state of a neutral position in which the operation handle 20 is not operated, and the input member 41 and the pawl operating member 37 are not rotated. At this time, as shown in FIG. 11, the driving lever 52 is biased by the spring 42b, and the engaging end portion 52a is engaged with the claw of the ratchet wheel 51. Further, as shown in FIGS. 12 and 13, the main pawls 32 are in a state of being pressed by the ring spring 36 and engaged with the ratchet wheel 31. At this state, the engaging projections 37d are engaged with the engaging protrusions 32a and held in a state of being engaged with the ratchet wheel 31. Further, the engaging protrusion 34a is pressed toward the ratchet wheel 31 by the engaging projection 37g, so that the sub-pawl 34 is engaged with the ratchet wheel 31. Therefore, the lock mechanism 30 is in a locked state, the ratchet wheel 31 is not rotated, and the height of the seat 1 is not changed on both the lifting side and the lowering side.

In the state where the operation handle 20 is in the neutral position as described above, the rotational angle of the pawl operating member 37 is accurately aligned to the reference position by aligning the projection 37a with the projection 38.

Figure 14:
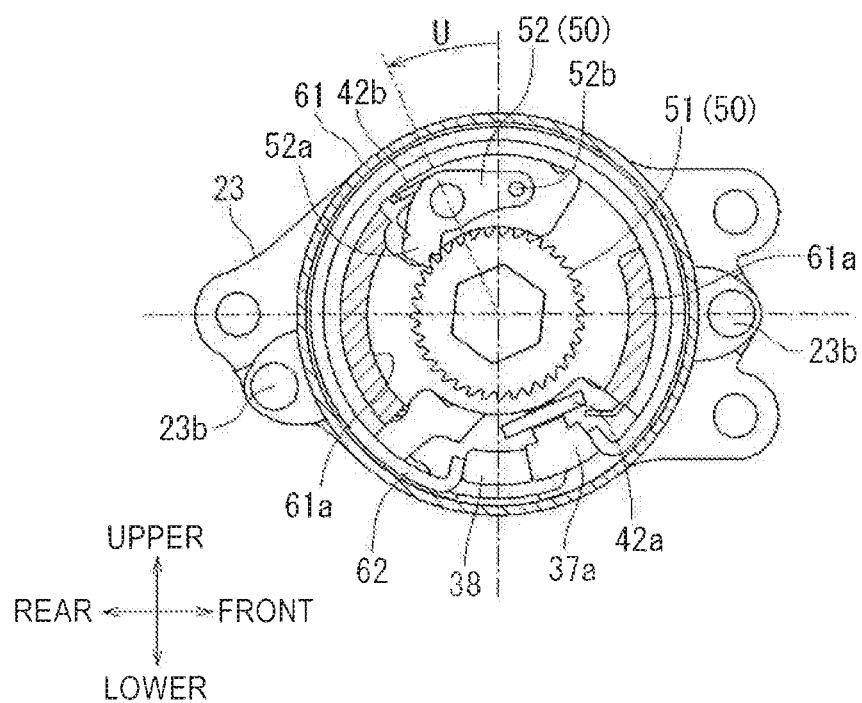
FIG. 14 is a sectional view similar to FIG. 11, showing a state in which an operation handle is operated to a lifting side by a first angle.
Figure 15:
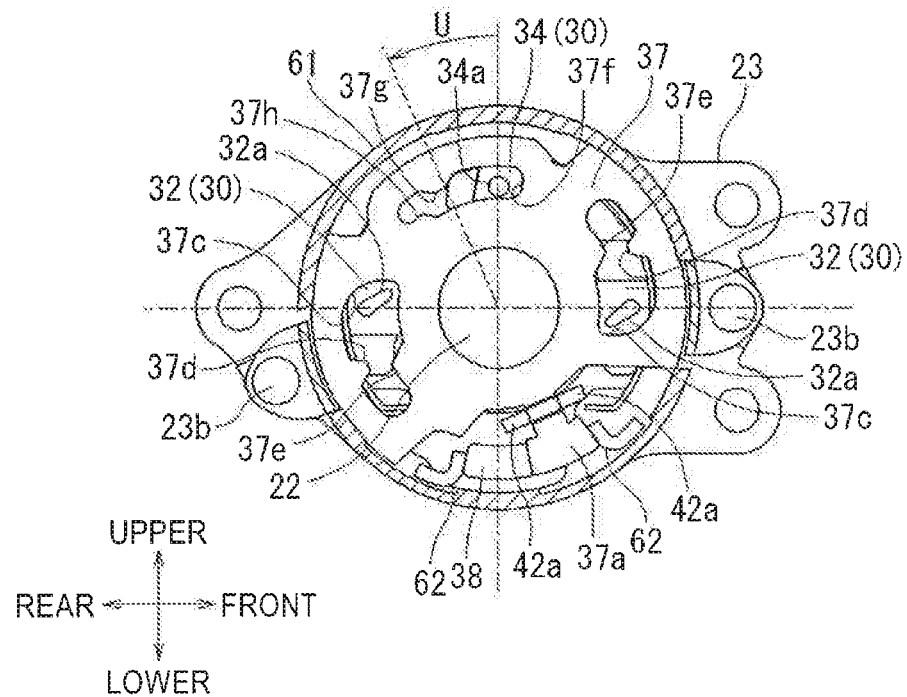
FIG. 15 is a sectional view similar to FIG. 12, showing the state in which the operation handle is operated to the lifting side by the first angle.
Figure 16:
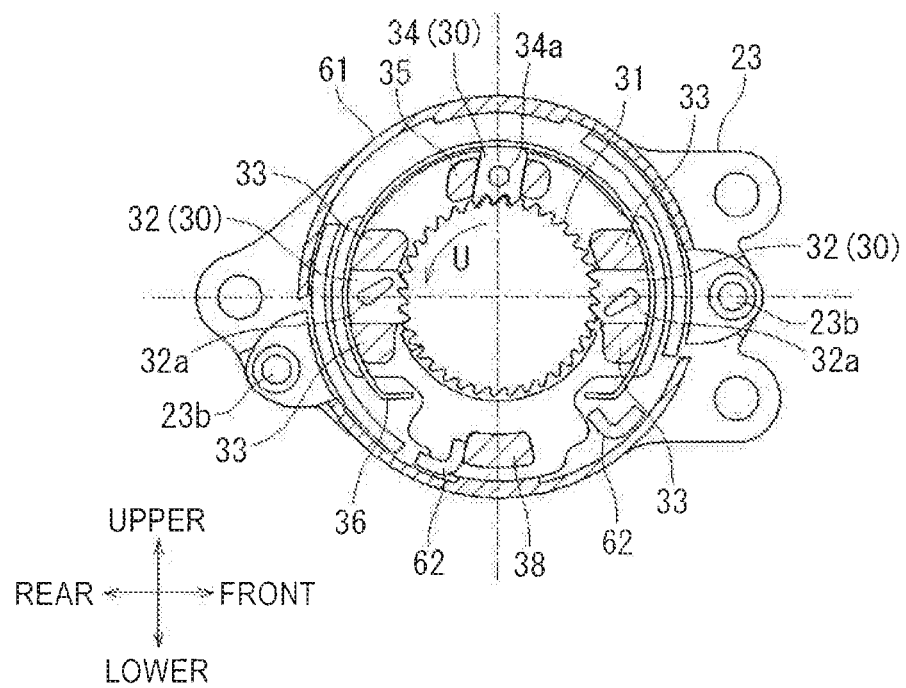
FIG. 16 is a sectional view similar to FIG. 13, showing the state in which the operation handle is operated to the lifting side by the first angle.

FIGS. 14 to 16 show a state in which the operation handle 20 is operated by a first angle U in the seat lifting direction. At this time, as shown in FIG. 14, the driving lever 52 rotates the ratchet wheel 51 by the first angle U in a state where the engaging end portion 52a is engaged with the claw of the ratchet wheel 51. Further, as shown in FIG. 15, the pawl operating member 37 is also rotated by the first angle U via the coupling member 42. As a result of the pawl operating member 37 being rotated, the engaging protrusions 32a of the main pawls 32 are not pressed by the engaging projections 37d. The engaging protrusion 34a of the sub-pawl 34 is also not pressed by the engaging projection 37g. Therefore, as shown in FIG. 16, the main pawls 32 and the sub-pawl 34 are biased in a direction to engage with the ratchet wheel 31 by the ring spring 36. At this state, the ratchet wheel 31 rotating together with the ratchet wheel 51 can rotate without being engaged with the claws of the main pawls 32 and the sub-pawl 34. As a result, the pinion gear 18 is rotated to lift the seat 1 by an amount corresponding to the first angle U.

When the operation of the operation handle 20 in the seat lifting direction is ended, the main pawls 32 and the sub-pawl 34 are engaged with the ratchet wheel 31 by the biasing of the ring spring 36. Further, since the pawl operating member 37 is returned to its neutral position, the engaging projections 37d and the engaging projection 37g of the pawl operating member 37 are engaged with the ratchet wheel 31 to lock the ratchet wheel 31.

Figure 17:
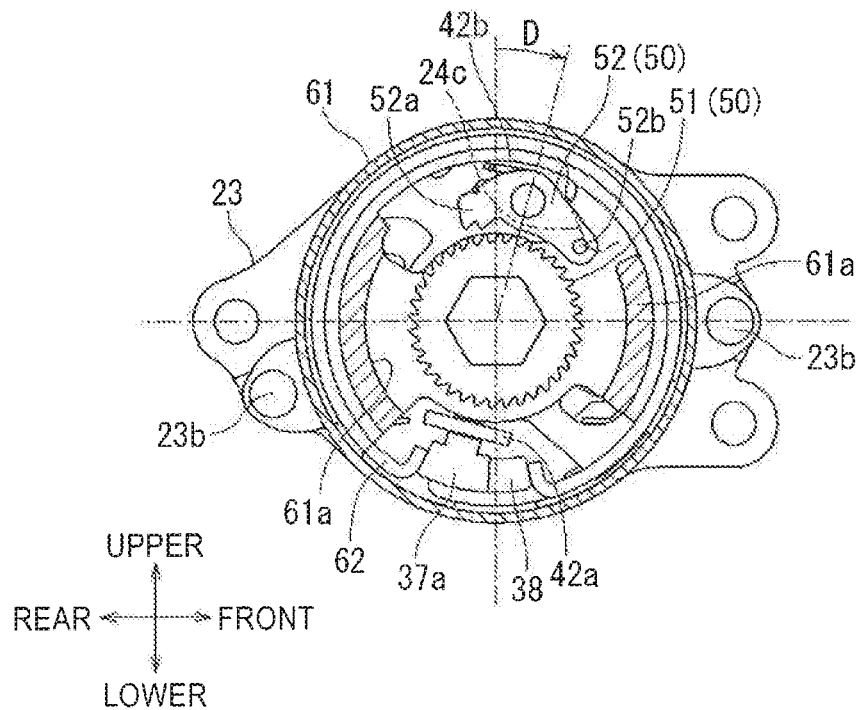
FIG. 17 is a sectional view similar to FIG. 11, showing a state in which the operation handle is operated to a lowering side by a second angle.
Figure 18:
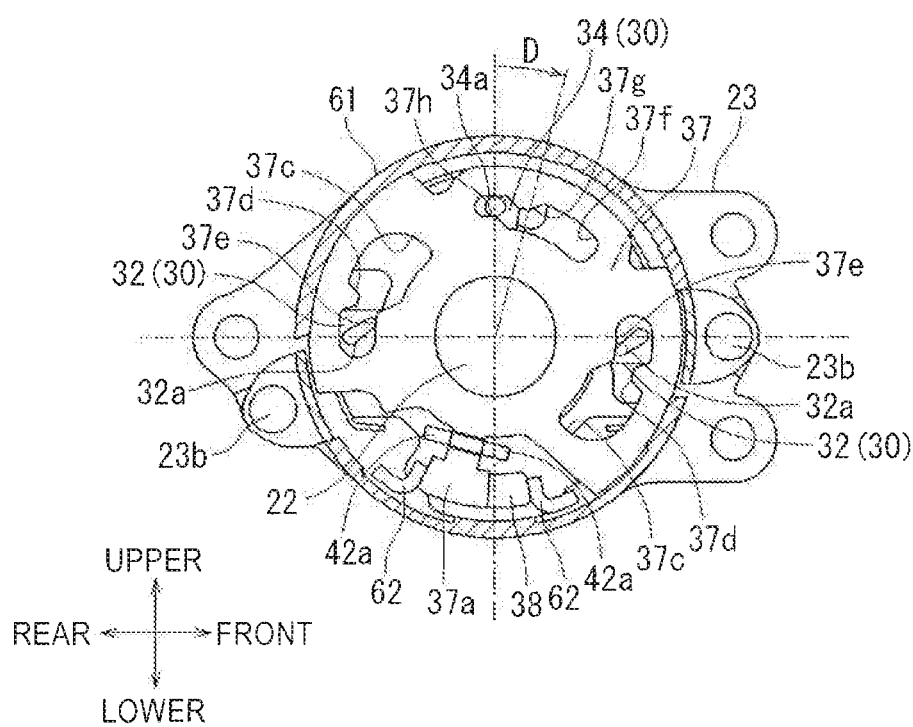
FIG. 18 is a sectional view similar to FIG. 12, showing the state in which the operation handle is operated to the lowering side by the second angle.
Figure 19:
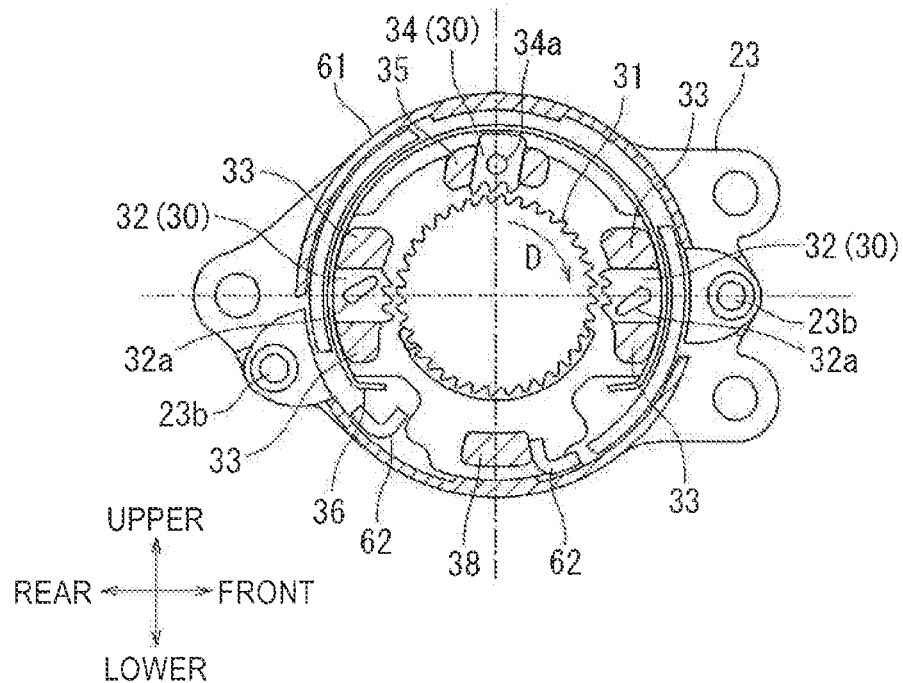
FIG. 19 is a sectional view similar to FIG. 13, showing the state in which the operation handle is operated to the lowering side by the second angle.

FIGS. 17 to 19 show a state in which the operation handle 20 is operated by a second angle D in the seat lowering direction from the neutral position, and the pawl operating member 37 is rotated by the second angle D in the seat lowering direction from the neutral position. As a result of the pawl operating member 37 being rotated, the engaging protrusions 32a of the main pawls 32 are not pressed by the engaging projections 37d but engaged with the engaging projections 37e, thereby moving the main pawls 32 in a direction in which the engagement with the ratchet wheel 31 is released. On the other hand, the engaging protrusion 34a of the sub-pawl 34 is not pressed by the engaging projection 37g and is moved along an inclined surface of the engaging projection 37h. Therefore, the main pawls 32 and the sub-pawl 34 are disengaged from the ratchet wheel 31. Accordingly, in this state, the locked state of the ratchet wheel 31 is released and the ratchet wheel 31 is freely rotatable. As a result, the pinion gear 18 is rotated, and the seat 1 is lowered. At this time, since the damper 19 is connected to the pinion gear 18, the lowering speed of the seat 1 is appropriately suppressed.

When the operation of the operation handle 20 in the seat lowering direction is ended, the main pawls 32 and the sub-pawl 34 are engaged with the ratchet wheel 31 by the biasing of the ring spring 36. Further, since the pawl operating member 37 is returned to its neutral position, the engaging projections 37d and the engaging projection 37g of the pawl operating member 37 are engaged with the ratchet wheel 31 to lock the ratchet wheel 31.

As described above, when lifting the seat 1, the operation handle 20 is operated to rotate in the lifting direction, and the ratchet wheel 51 is rotated in accordance with the operation amount. In this manner, the seat 1 is lifted. When the lifting amount is insufficient, the seat 1 can be lifted by further repeating the rotation operation of the operation handle 20.

Figure 21:
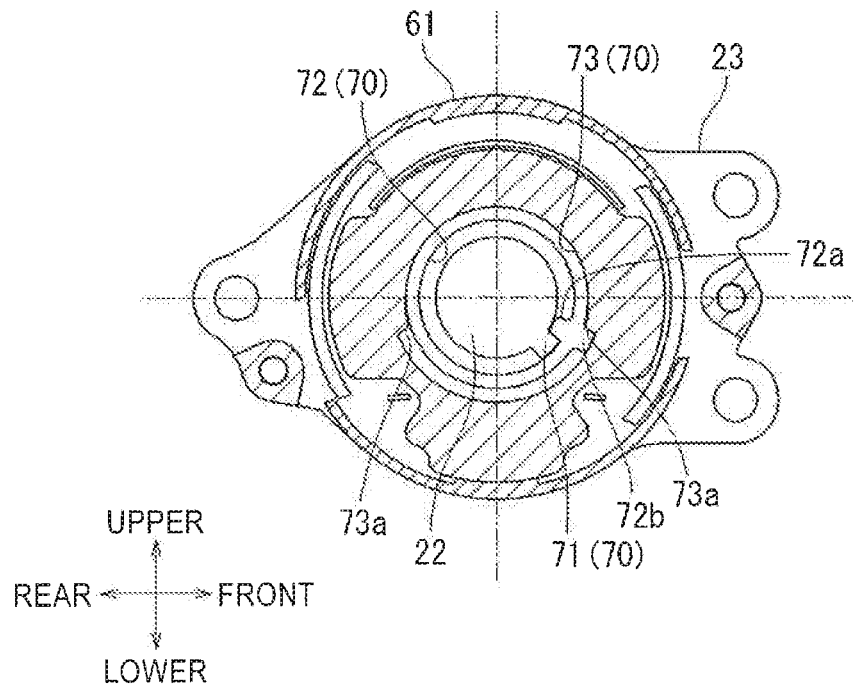
FIG. 21 is a sectional view similar to FIG. 20, showing a state in which the seat is at an upper limit position.

When the ratchet wheel 31 and the rotation shaft 22 are rotated, the projection 71 is also rotated, as shown in FIG. 20. The ring 72 is not rotated while the first engaging portion 72a of the ring 72 is positioned rearward with respect to the rotational direction. However, when the rotational angles of the ratchet wheel 31 and the rotation shaft 22 increase, and the first engaging portion 72a is located in front of the projection 71 and pressed by the projection 71, the ring 72 is rotated together with the ratchet wheel 31 and the rotation shaft 22. Eventually, when the height of the seat 1 reaches an upper limit position, the second engaging portion 72b of the ring 72 comes into contact with the front abutting surface portion 73a and the rotation of the ring 72 is restricted, as shown in FIG. 21. Therefore, the projection 71 cannot be rotated by the first engaging portion 72a, and the rotation of the ratchet wheel 31 and the rotation shaft 22 is restricted. In this manner, the pinion gear 18 cannot rotate, and the lifting of the seat is stopped.

When lowering the seat, the operation handle 20 is operated to rotate in the lowering direction, and the locked state of the ratchet wheel 31 by the main pawls 32 and the sub-pawl 34 is released. In this manner, the seat 1 is lowered.

Figure 22:
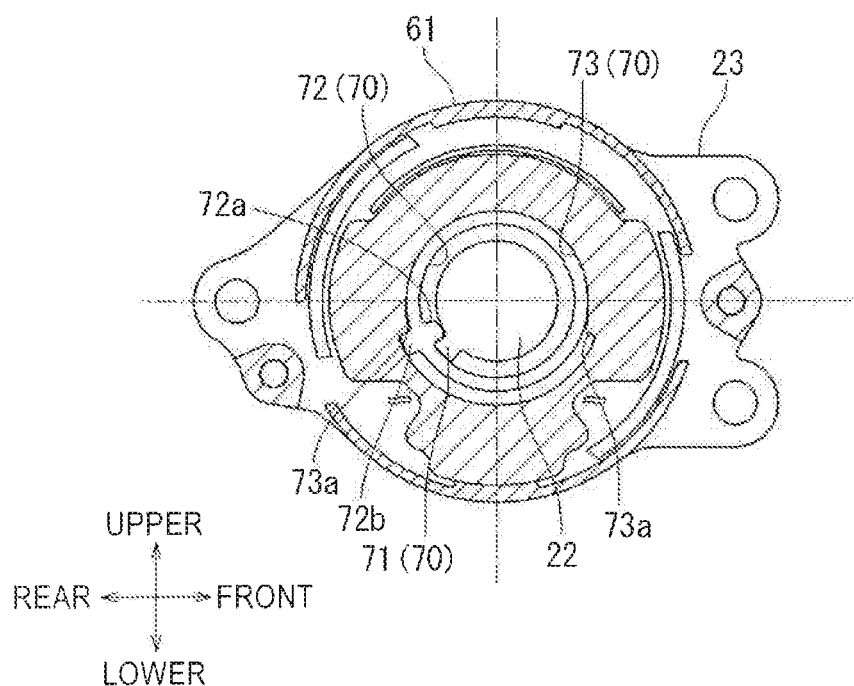
FIG. 22 is a sectional view similar to FIG. 20, showing a state in which the seat is at a lower limit position.

FIG. 22 shows a state in which the height of the seat 1 reaches a lower limit position. Until just before reaching the lower limit position, the first engaging portion 72a of the ring 72 is pressed by the projection 71 and rotated in a clockwise direction in FIG. 22. In this manner, the second engaging portion 72b is abutted against the rear abutting surface portion 73a to restrict the rotation. Therefore, the rotation of the ratchet wheel 31 and the rotation shaft 22 is restricted and the pinion gear 18 cannot rotate, so that the lowering of the seat is stopped.

Effect of One Embodiment

According to the above embodiment, by causing the projection 37a of the pawl operating member 37 to overlap with the projection 38 of the support member 23 in the rotational direction of the pawl operating member 37 in the non-operated state of the operation handle 20, the pawl operating member 37 is aligned to the reference position. More specifically, by causing a position of the projection 37a of the pawl operating member 37 to coincide with a position of the projection 38 of the support member 23 in the rotational direction of the pawl operating member 37 in the non-operated state of the operation handle 20, the pawl operating member 37 is aligned to the reference position. At this time, the projection 37a of the pawl operating member 37 is directly aligned with the projection 38 of the support member 23. Therefore, no other parts are interposed between the projection 37a and the projection 38 at the time of alignment, and the alignment can be performed without being affected by the dimensional accuracy of other pans. As a result, there is no need to increase the dimensional accuracy of other parts in order to improve the accuracy of the alignment. In this manner, it is also possible to solve the problem that the cost of other parts increases.

Other Embodiments

Figure 7:
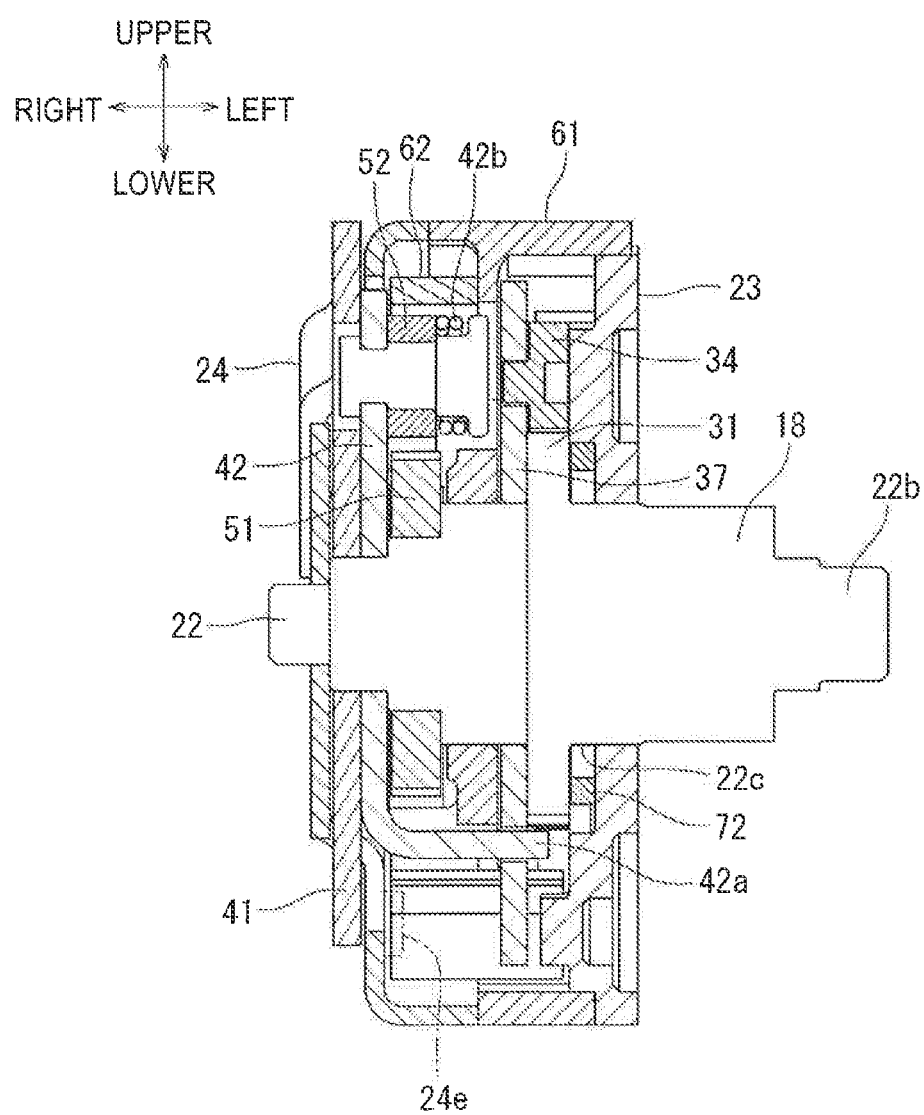
FIG. 7 is a sectional view taken the line VII-VII in FIG. 6.

Although specific embodiments have been described above, the disclosure is not limited to the appearances and configurations in these embodiments, and various modifications, additions and deletions can be made. For example, in the above embodiments, the alignment of the pawl operating member 37 to the reference position is performed by sandwiching the projection 37a of the pawl operating member 37 and the projection 38 of the support member 23 between the extending end portions 62a of the ring spring 62. For this configuration, as shown by imaginary lines in FIGS. 7 and 9, extending end portions 62b may be additionally provided in the ring spring 62 and a projection 24e may be additionally provided in the opening 24b of the cover 24. In this manner, the alignment of the pawl operating member 37 to the reference position can be stably performed. In this case, the projection 24e is located at a position coincident with the projection 38 on the support member 23 in the rotational direction of the rotation shaft 22. Further, as shown in FIG. 7, the projection 24e is located at a position where it does not interfere with the input member 41 inserted into the opening 24b. Further, the extending end portions 62b are provided symmetrically with the extending end portions 62a on the ring spring 62. In addition, the projection 24e is sandwiched between the extending end portions 62b simultaneously when the projection 37a and the projection 38 are sandwiched between the extending end portions 62a of the ring spring 62 in the non-operated state of the operation handle 20. Therefore, when the projection 37a and the projection 38 are sandwiched between the extending end portions 62a, there is no case that only the left side of the ring spring 62 is enlarged and thus tilted. Since the projection 24e is sandwiched between the extending end portions 62b, the right side of the ring spring 62 is also enlarged. In this manner, the degree of opening of the ring spring 62 is balanced on the left and right sides. As a result, the alignment of the pawl operating member 37 to the reference position by the ring spring 62 can be stably performed.

Further, in the above embodiment, the disclosure is applied to a vehicle seat. However, the disclosure may be applied to a seat mounted on an airplane, a ship, a train or the like, or a seat installed in a movie theater or the like.

The disclosure provides illustrative, non-limiting examples as follows:

According to a first aspect of the disclosure, there is provided a lifter device including: a pinion gear meshing with an input gear of a link mechanism for lifting and lowering a seat; and a rotation control device configured to control rotation of the pinion gear, the rotation control device including: a rotation shaft configured to rotate in synchronization with the pinion gear; a support member configured to rotatably support the rotation shaft; a rotation driving mechanism provided to the rotation shaft, the rotation driving mechanism being configured to rotationally drive the rotation shaft in a lifting direction when an operation handle for lifting and lowering the seat is operated to lift the seat and being configured to bring the rotation shaft into a free rotation state without rotationally driving the rotation shaft when the operation handle is operated to lower the seat; and a lock mechanism provided to the rotation shaft, the lock mechanism being configured to lock the rotation of the rotation shaft at an operation end position of the operation handle when the operation handle is operated to lift the seat and being configured to bring the rotation shaft into a free rotation state without locking the rotation of the rotation shaft when the operation handle is operated to lower the seat, wherein the lock mechanism includes: a ratchet wheel configured to rotate in synchronization with the rotation shaft and having an engaging claw formed on its outer periphery; a pawl configured to be held on the support member so as to be prevented from moving in a rotational direction of the rotation shaft and to be movable in a radial direction of the rotation shaft, the pawl being provided to be engageable with the engaging claw of the ratchet wheel; a first spring configured to bias the pawl in a direction of engaging with the ratchet wheel; and a pawl operating member configured to bring the pawl into an engagement state with ratchet wheel in a non-operated state of the operation handle, configured to bring the pawl into a free state when the operation handle is operated to a seat lifting side, and configured to separate the pawl from the ratchet wheel when the operation handle is operated to a seat lowering side, wherein the engaging claw of the ratchet wheel has a shape that does not engage with the pawl when the ratchet wheel is rotated in the lifting direction together with the rotation shaft and that engages with the pawl when the ratchet wheel is rotated in the lowering direction together with the rotation shaft, wherein the pawl operating member is configured to be rotatable with respect to the rotation shaft so as to rotate in accordance with the operation of the operation handle and includes a first projection protrudingly formed on its outer peripheral side for rotational alignment, wherein the support member includes a second projection which is protrudingly formed so as to face the first projection and which serves as a reference position of the pawl operating member in the rotational direction, and wherein, in a state where the operation handle is not operated, a second spring is configured to bias the first projection so as to overlap with the second projection in the rotational direction of the pawl operating member.

According to the first aspect, by causing the first projection of the pawl operating member to overlap with the second projection of the support member in the rotational direction of the pawl operating member in the non-operated state of the operation handle, the pawl operating member is aligned to the reference position. At this time, the first projection of the pawl operating member is directly aligned with the second projection of the support member. Therefore, no other parts are interposed between the first projection and the second projection at the time of alignment, and the alignment can be performed without being affected by the dimensional accuracy of other parts. As a result, there is no need to increase the dimensional accuracy of other parts in order to improve the accuracy of the alignment. In this manner, it is also possible to solve the problem that the cost of other parts increases.

According to a second aspect of the disclosure, there is provided the lifter device according to the first aspect, wherein the pawl operating member is disposed so as to overlap with the support member in an axial direction of the rotation shaft, wherein the second spring is an open ring spring whose ring shape is partially cut off and which generates a biasing force in a direction of contracting a diameter of the ring shape, a planar surface formed by the ring shape of the ring spring overlapping with the pawl operating member in the axial direction of the rotation shaft, wherein the ring spring includes extending end portions which are provided at an open end of the ring shape thereof and extend toward the support member in a center axis direction of the ring shape, and wherein the extending end portions are disposed to sandwich the first projection and the second projection from both sides in the rotational direction of the pawl operating member.

According to the second aspect, the pawl operating member and the ring spring are overlapped with each other on the support member. Therefore, the configuration of the lock mechanism can be miniaturized. In this configuration, the extending end portions are provided to the ring spring. Therefore, even when the first projection and the second projection are separated from each other in an overlapping direction, a biasing force can be applied to the first projection and the second projection by the ring spring.

According to a third aspect of the disclosure, there is provided the lifter device according to the first or second aspect, wherein, in the state where the operation handle is not operated, the second spring is configured to bias the first projection so that a position of the first projection coincides with a position of the second projection in the rotational direction of the pawl operating member.

According to the third aspect, by causing the position of the first projection of the pawl operating member to overlap with the position of the second projection of the support member in the rotational direction of the pawl operating member in the non-operated state of the operation handle, the pawl operating member is aligned to the reference position. At this time, the first projection of the pawl operating member is directly aligned with the second projection of the support member. Therefore, no other parts are interposed between the first projection and the second projection at the time of alignment, and the alignment can be performed without being affected by the dimensional accuracy of other parts. As a result, there is no need to increase the dimensional accuracy of other parts in order to improve the accuracy of the alignment. In this manner, it is also possible to solve the problem that the cost of other parts increases.

What is claimed is:

1. A lifter device comprising:
   a pinion gear meshing with an input gear of a link mechanism for lifting and lowering a seat; and
   a rotation control device configured to control rotation of the pinion gear, the rotation control device including:
      a rotation shaft configured to rotate in synchronization with the pinion gear;
      a support member configured to rotatably support the rotation shaft;
      a rotation driving mechanism provided to the rotation shaft, the rotation driving mechanism being configured to rotationally drive the rotation shaft in a lifting direction when an operation handle for lifting and lowering the seat is operated to lift the seat and being configured to bring the rotation shaft into a free rotation state without rotationally driving the rotation shaft when the operation handle is operated to lower the seat; and
      a lock mechanism provided to the rotation shaft, the lock mechanism being configured to lock the rotation of the rotation shaft at an operation end position of the operation handle when the operation handle is operated to lift the seat and being configured to bring the rotation shaft into a free rotation state without locking the rotation of the rotation shaft when the operation handle is operated to lower the seat,
   wherein the lock mechanism includes:
      a ratchet wheel configured to rotate in synchronization with the rotation shaft and having an engaging claw formed on its outer periphery;
      a pawl configured to be held on the support member so as to be prevented from moving in a rotational direction of the rotation shaft and to be movable in a radial direction of the rotation shaft, the pawl being provided to be engageable with the engaging claw of the ratchet wheel;
      a first spring configured to bias the pawl in a direction of engaging with the ratchet wheel; and
      a pawl operating member configured to bring the pawl into an engagement state with ratchet wheel in a non-operated state of the operation handle, configured to bring the pawl into a free state when the operation handle is operated to a seat lifting side, and configured to separate the pawl from the ratchet wheel when the operation handle is operated to a seat lowering side,
   wherein the engaging claw of the ratchet wheel has a shape that does not engage with the pawl when the ratchet wheel is rotated in the lifting direction together with the rotation shaft and that engages with the pawl when the ratchet wheel is rotated in the lowering direction together with the rotation shaft,
   wherein the pawl operating member is configured to be rotatable with respect to the rotation shaft so as to rotate in accordance with the operation of the operation handle and includes a first projection protrudingly formed on its outer peripheral side for rotational alignment,
   wherein the support member includes a second projection which is protrudingly formed so as to face the first projection and which serves as a reference position of the pawl operating member in the rotational direction, and
   wherein, in a state where the operation handle is not operated, a second spring is configured to bias the first projection so as to overlap with the second projection in the rotational direction of the pawl operating member.

2. The lifter device according to claim 1,
   wherein the pawl operating member is disposed so as to overlap with the support member in an axial direction of the rotation shaft,
   wherein the second spring is an open ring spring whose ring shape is partially cut off and which generates a biasing force in a direction of contracting a diameter of the ring shape, a planar surface formed by the ring shape of the ring spring overlapping with the pawl operating member in the axial direction of the rotation shaft,
   wherein the ring spring includes extending end portions which are provided at an open end of the ring shape thereof and extend toward the support member in a center axis direction of the ring shape, and
   wherein the extending end portions are disposed to sandwich the first projection and the second projection from both sides in the rotational direction of the pawl operating member.

3. The lifter device according to claim 1,
   wherein, in the state where the operation handle is not operated, the second spring is configured to bias the first projection so that a position of the first projection coincides with a position of the second projection in the rotational direction of the pawl operating member.

* * * * *